US008298084B2

(12) United States Patent
Yee (10) Patent No.: US 8,298,084 B2
(45) Date of Patent: Oct. 30, 2012

(54) MULTI-PLAYER GAME CONTROLLER SYSTEM WITH COMBINABLE HAND-HELD GAME CONTROLLERS

(76) Inventor: Edmond Yee, Los Angeles, CA (US)

(*) Notice: Subject to any disclaimer, the term of this patent is extended or adjusted under 35 U.S.C. 154(b) by 0 days.

(21) Appl. No.: 13/020,691

(22) Filed: Feb. 3, 2011

(65) Prior Publication Data

US 2012/0202597 A1    Aug. 9, 2012

(51) Int. Cl.
*A63F 9/24* (2006.01)
(52) U.S. Cl. ............................................. 463/37; 463/38
(58) Field of Classification Search .................... 436/37, 436/38; 463/37, 38
See application file for complete search history.

(56) References Cited

U.S. PATENT DOCUMENTS

| | | | |
|---|---|---|---|
| 6,811,491 B1 | 11/2004 | Levenberg et al. | |
| 7,331,793 B2 | 2/2008 | Hernandez et al. | |
| 7,407,439 B1 | 8/2008 | Ochoa | |
| 7,653,771 B2 | 1/2010 | Liberty | |
| 2007/0293318 A1 | 12/2007 | Tetterington et al. | |
| 2008/0146336 A1 | 6/2008 | Feldman et al. | |
| 2009/0005164 A1 | 1/2009 | Chang | |
| 2009/0054159 A1 | 2/2009 | Gadda et al. | |
| 2009/0149256 A1 | 6/2009 | Lui | |
| 2009/0298590 A1* | 12/2009 | Marks et al. | 463/37 |
| 2010/0118195 A1 | 5/2010 | Eom et al. | |
| 2010/0194350 A1 | 8/2010 | Chatterjee et al. | |
| 2012/0088582 A1 | 4/2012 | Wu et al. | |

* cited by examiner

*Primary Examiner* — Omkar Deodhar
(74) *Attorney, Agent, or Firm* — Stetina Brunda Garred & Brucker (57) ABSTRACT

There is provided a multi-player game controller system first and second hand-held game controllers and engagement circuitry. The first hand-held game controller includes a first input control configured to generate a first input control signal in response to interaction with a first user. The second input controller includes a second input control configured to generate a second input control signal in response to interaction with a second user. The first and second hand-held game controllers have engagement states of an engaged state and an unengaged state. The engagement circuitry is configured to generate an engagement signal when the first and second hand-held game controllers are in an engagement state. There is also provided methods of operating the multi-player game controller system.

24 Claims, 5 Drawing Sheets

MULTI-PLAYER GAME CONTROLLER SYSTEM WITH COMBINABLE HAND-HELD GAME CONTROLLERS

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to game controllers. More particularly, the present disclosure relates to a multi-player game controller system with combinable first and second hand-held game controllers and method of using the same.

2. Related Art

Multi-player video games continue to be ever increasing in popularity. These multi-player games may allow for more than one user or player to "play" a game at the same time. This allows for virtual interactions among players in the gaming space created by the video game environment. A game platform is an interactive entertainment computer or video game system that utilizes a combination of hardware, software and/or firmware to interact with users or players via game controllers for receiving user inputs and an output device (such as a display device, such as a television or monitor). Game platforms may be configured to allow for multi-player video games. A popular type of game platform is the game console. These devices may operate independent of any personal computer and have various hardware contained in a housing or "set top box". Contemporary examples of such platforms include the "Xbox" series of devices manufactured by the Microsoft Corporation, the "Playstation" series of devices manufactured by the Sony Corporation, and the "GameCube" and "Wii" series of devices by the Nintendo Co., Ltd. These game platforms may be used in conjunction with personal computers and may be connected to a computer network, such as the Internet, to allow for remote player interaction.

The game controllers may be hand-held (as opposed to a computer keyboard with or without a computer mouse, or a dedicated integrated system like an arcade game). Such hand-held game controllers are typically configured to be specific to a particular game platform. These input devices may be hard wired (such as with an electrical conduit or cord connecting the game controller to a game platform console or computer) or wirelessly connected (such as with transmitted signals passing between the game controller ad the game platform console or computer). Some hand-held game controllers may even be integrated with the game platform itself. For example, modern mobile phone devices, personal digital assistants (PDA's) or tablet devices may support both the hardware and software requirements to support game platform and game controller functionality all in a single device. Moreover, such integrated devices may be configured to support multi-player gaming with other similar configured devices in close proximity to each other.

A contemporary video game trend has focused on player-to-player interactions within the virtual world. Massively multi-player online games (MMOG) are capable of supporting over thousands of players in a single virtual environment. However, these games are typically played by individuals who are physically remote from each other, thereby removing the fun and pleasure that one experience when other players are physically present. With regard to multi-player video games that are played by players who are physically present with each other, actual personal interaction outside of the virtual game environment during game play is not required.

In view of the foregoing, there is a need in the art for an improved system and/or method for facilitating the game play experience of individuals with each other who are physically present with each other.

BRIEF SUMMARY

In accordance with one embodiment, a multi-player game controller system is contemplated. The multi-player game controller system includes first and second hand-held game controllers and engagement circuitry. The first hand-held game controller includes a first game controller housing, and a first input control attached to the first game controller housing. The first input control is configured to generate a first input control signal in response to interaction with a first user. The first and second hand-held game controllers have engagement states of an engaged state and an unengaged state. The first and second game controllers are in fixed physical relation to each other with respect to at least one degree of freedom when in the engaged state. The first and second hand-held game controllers are independently movable in relation to each other when in the unengaged state. The second hand-held game controller includes a second game controller housing, and a second input control attached to the second game controller housing. The second input control is configured to generate a second input control signal in response to interaction with a second user. The engagement circuitry is configured to generate an engagement signal when the first and second hand-held game controllers are in an engagement state.

As mentioned above, the multi-player game controller system requires that the hand-held game controllers have the capability to be in an engaged state and an unengaged state with each other. In this regard, the users who use the multi-player game controller system are required to physically and cooperatively move the game controllers into and out of engagement with each other. This engagement is contemplated to greatly enhance and change how game players personally interact with one another in a dimension not previously explored.

In accordance with various embodiments, the first hand-held game controller may further include a first magnet, and the second hand-held game controller may further include a second magnet. The first and second magnets are configured to magnetically interact with each other with the first and second hand-held game controllers being in the engaged state. The first and second magnets may be configured to physically contact each other with the first and second hand-held game controllers being in the engaged state. The first and second magnets may be in electrical communication with the engagement circuitry. The first hand-held game controller may further include an infrared light source, and the second hand-held game controller may further include an infrared light detector sized and configured to detect infrared light from the infrared light source with the first and second hand-held game controllers being in the engaged state. The first and second hand-held game controllers may be in physical contact with each other when in the engaged state.

Further, the first hand-held game controller may include a first acceleration sensor configured to generate an acceleration signal in response to changes in acceleration of the first hand-held game controller with respect to an axis of motion. The first acceleration sensor may be an accelerometer. The first acceleration sensor may be configured to generate the acceleration signal in response to changes in acceleration of the first hand-held game controller with respect to an axis of motion. The first acceleration sensor may be configured to generate the acceleration signal in response to changes in rotational acceleration of the first hand-held game controller with respect to an axis of motion. The first hand-held game controller further includes a wireless transmitter configured to transmit the engagement signal.

The game controller system may include additional game controllers. In this regard, the game controller system may further include a third hand-held game controller. The second and third game controllers have engagement states of an engaged state and an unengaged state. The second and third hand-held game controller are in fixed physical relation to each other with respect to at least one degree of freedom when in the engaged state, the second and third hand-held game controllers are independently movable in relation to each other when in the unengaged state, the third hand-held game controller includes a third game controller housing and a third input control attached to the third controller housing, the third input control is configured to generate a third input control signal in response to interaction with a third user, the engagement circuitry is configured to generate an engagement signal when the second and third hand-held game controllers are in an engagement state. In addition, the first hand-held game controller may further include a first magnet, the second hand-held game controller further may include a second magnet, and the first and second magnets are configured to magnetically interact with each other with the first and second hand-held game controllers being in the engaged state. The second hand-held game controller may further include a third magnet, the third hand-held game controller may include a fourth magnet, and the third and fourth magnets are configured to magnetically interact with each other with the second and third hand-held controllers being in the engaged state.

The game controller system may further include a game platform that is configured to receive the first input control signal, the second input control signal, and the engagement signal. The game platform may be configured to wirelessly receive the first input control signal, the second input control signal, and the engagement signal. The first and second hand-held game controllers may be in fixed physical relation to each other with respect to all of degrees of freedom when in the engaged state.

According to another embodiment there is provided a multi-player game controller system. The multi-player game controller system includes first and second hand-held game controllers and engagement circuitry. The first hand-held game controller includes a first game controller housing, and a first input control attached to the first game controller housing. The first input control is configured to generate a first input control signal in response to interaction with a first user. The first and second hand-held game controllers have engagement states of an engaged state and an unengaged state. The first and second game controllers are in close physical proximity to each other when in the engaged state. The first and second hand-held game controllers are independently movable in relation to each other when in the unengaged state. The second hand-held game controller includes a second game controller housing, and a second input control attached to the second game controller housing. The second input control is configured to generate a second input control signal in response to interaction with a second user. The engagement circuitry is configured to generate an engagement signal when the first and second hand-held game controllers are in an engagement state.

According to various embodiments, the first hand-held game controller may further include an infrared light source, and the second hand-held game controller may further include an infrared light detector sized and configured to detect infrared light from the infrared light source with the first and second hand-held game controllers being in the engaged state. The second hand-held game controller may further include a transmitter in electrical communication with the infrared light detector, and the engagement circuitry includes the transmitter. The transmitter may be configured to wirelessly transmit the engagement signal upon detection of infrared light from the infrared light source by the infrared light detector. The game controller system may further include an infrared light source and an infrared light detector cooperative configured to determine a distance between the first and second hand-held game controllers. The engagement circuitry may be configured to generate an engagement signal when the first and second hand-held game controllers are within a pre-determined distance of each other.

According to yet another embodiment there is provided a method of operating a multi-player game controller system. The method includes providing to a first user a first hand-held game controller including a first game controller housing and a first input control attached to the first game controller housing. The first input control is configured to generate a first input control signal in response to interaction with the first user. The method further includes providing to a second user a second hand-held game controller. The first and second hand-held game controllers have engagement states of an engaged state and an unengaged state. The first and second game controllers are in fixed physical relation to each other with respect to at least one degree of freedom when in the engaged state. The first and second hand-held game controllers are independently movable in relation to each other when in the unengaged state. The second hand-held game controller includes a second game controller housing and a second input control attached to the second game controller housing, and the second input control is configured to generate a second input control signal in response to interaction with the second user. The method further includes moving the first and second hand-held game controllers into the engaged state. The method further includes generating an engagement signal when the first and second hand-held game controllers are in an engagement state. According to various embodiments, the method may include moving the first and second hand-held game controllers into contact with each other. The method may include wirelessly transmitting the engagement signal. The method may include generating a first input control signal in response to interaction with the first user and the first hand-held game controller with the first and second hand-held game controllers in the engaged state.

According to yet another embodiment there is provided a method of operating a multi-player game controller system. The method includes providing to a first user a first hand-held game controller including a first game controller housing and a first input control attached to the first game controller housing. The first input control is configured to generate a first input control signal in response to interaction with the first user. The method includes providing to a second user a second hand-held game controller. The first and second hand-held game controllers have engagement states of an engaged state and an unengaged state. The first and second hand-held game controllers are in close proximity to each other when in the engaged state, and the first and second hand-held game controllers are independently movable in relation to each other when in the unengaged state. The second hand-held game controller includes a second game controller housing and a second input control attached to the second game controller housing. The second input control is configured to generate a second input control signal in response to interaction with the second user. The method includes moving the first and second hand-held game controllers into the engaged state. The method includes generating an engagement signal when the first and second hand-held game controllers are in an engagement state. The method may include wirelessly transmitting the engagement signal.

The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The detailed description set forth below in connection with the appended drawings is intended as a description of certain embodiments of the present disclosure, and is not intended to represent the only forms that may be developed or utilized. The description sets forth the various functions in connection with the illustrated embodiments, but it is to be understood, however, that the same or equivalent functions may be accomplished by different embodiments that are also intended to be encompassed within the scope of the present disclosure. It is further understood that the use of relational terms such as top and bottom, first and second, and the like are used solely to distinguish one entity from another without necessarily requiring or implying any actual such relationship or order between such entities.

Figure 1:
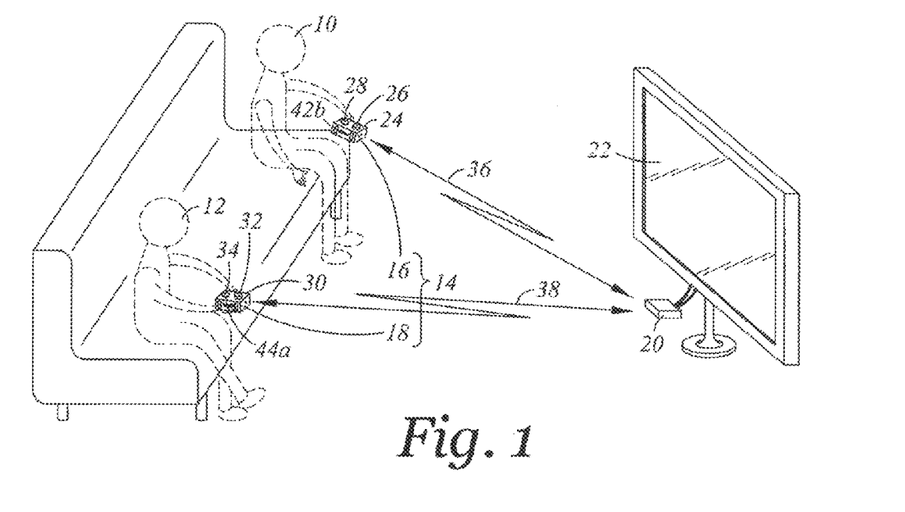
FIG. 1 is a symbolic exemplary environment including users as interacting with a multi-player game controller system with first and second hand-held game controllers in an unengaged state, a game platform, and display device.
Figure 2:
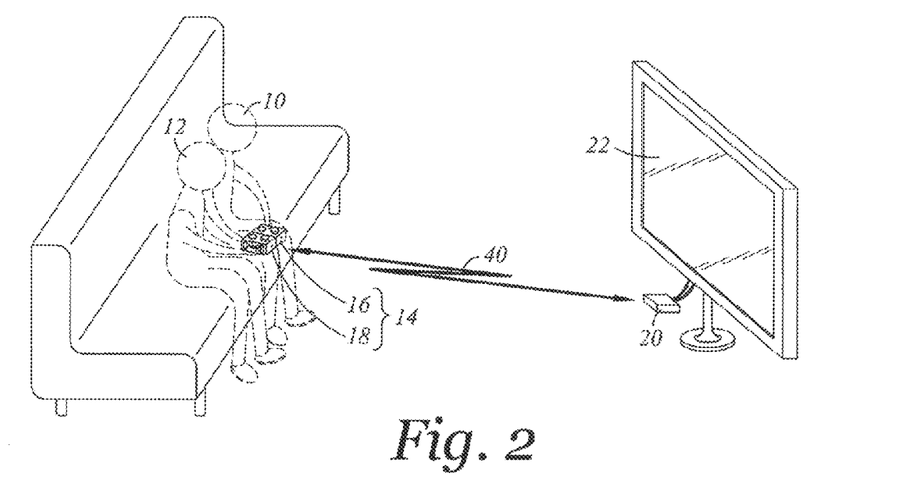
FIG. 2 is the symbolic exemplary environment of FIG. 1 with the hand-held game controllers in an engaged state.
Figure 3:
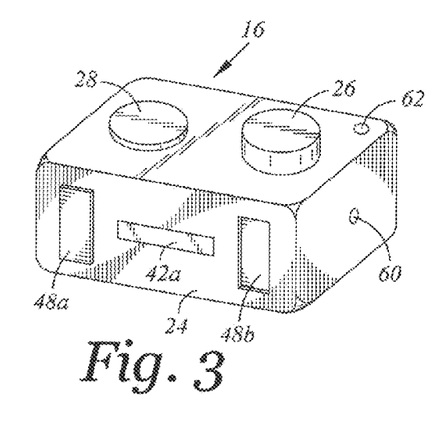
FIG. 3 is a perspective view of the first hand-held game controller of FIGS. 1-2.
Figure 4:
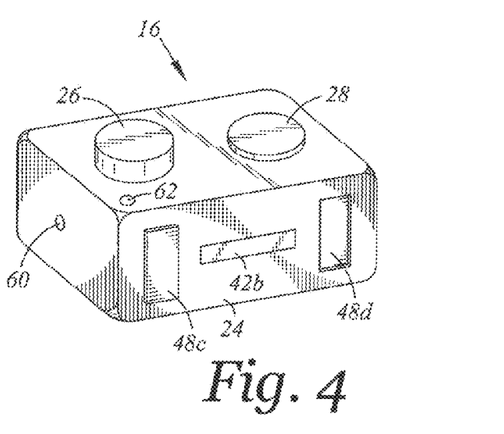
FIG. 4 is a perspective view of the first hand-held game controller of FIG. 3 as illustrated from a different angle.
Figure 5:
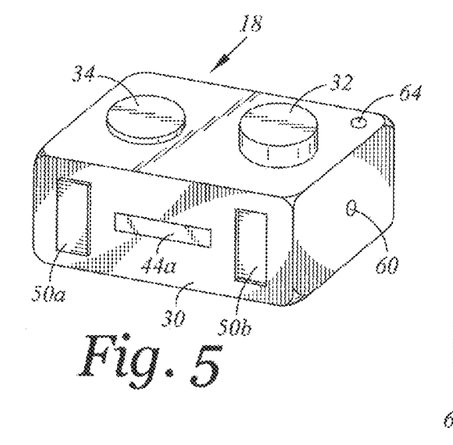
FIG. 5 is a perspective view of the second hand-held game controller of FIGS. 1-2.
Figure 6:
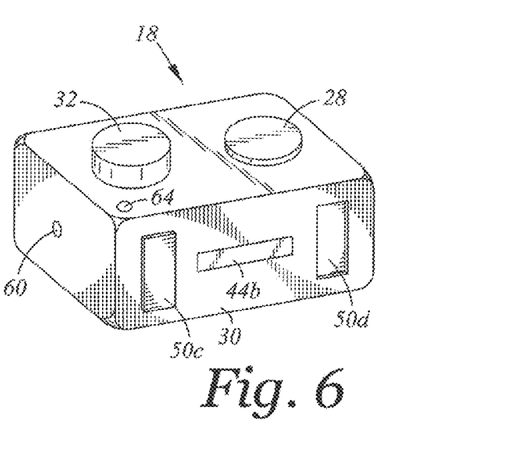
FIG. 6 is a perspective view of the second hand-held game controller of FIG. 5 as illustrated from a different angle.

Referring now to FIG. 1, there is depicted a symbolic exemplary environment including first and second users 10, 12 as interacting with a multi-player game controller system 14. The multi-player game controller system 14 includes a first hand-held game controller 16 as being used by the first user 10 and a second hand-held game controller 18 as being used by a second user 12. As will be further described below the first and second hand-held game controllers 16, 18 are in an unengaged state. There is also illustrated a game platform 20 and a display device 22. Referring additionally to FIG. 2, there is depicted the symbolic exemplary environment of FIG. 1 with the first and second, hand-held game controllers 16, 18 in an engaged state.

In accordance with one embodiment of the present disclosure, the multi-player game controller system 14 includes the first and second hand-held game controllers 16, 18. The multi-player game controller system 14 further includes engagement circuitry 46 (as symbolically depicted in FIG. 7 as discussed further below). The first hand-held game controller 16 includes a first game controller housing 24, and a first input control, such as a knob 26 or a button 28, attached to the first game controller housing 24. The first input control is configured to generate a first input control signal 36 in response to interaction with the first user 10. The first and second hand-held game controllers 16, 18 have engagement states of an engaged state and an unengaged state. The first and second game controllers 16, 18 are in fixed physical relation to each other with respect to at least one degree of freedom when in the engaged state. The first and second hand-held game controllers 16, 18 are independently movable in relation to each other when in the unengaged state. The second hand-held game controller 18 includes a second game controller housing 30, and a second input control, such as a knob 32 or a button 34, attached to the second game controller housing 30. The second input control 18 is configured to generate a second input control signal 38 in response to interaction with a second user 12. The engagement circuitry 46 is configured to generate an engagement signal 40 in response to the first and second hand-held game controllers 16, 18 being in the engagement state.

As mentioned above, the multi-player game controller system 14 requires that the hand-held game controllers have the capability to be in an engaged state and an unengaged state with each other. In this regard, the users who use the multi-player game controller system 14 are required to physically and cooperatively move the game controllers 16, 18 into and out of engagement with each other. This engagement is contemplated to greatly enhance and change how game players personally interact with one another in a dimension not previously explored.

As used herein the engagement circuitry 46 refers to any combination of electrical components and connecting electrical conduits that are used to generate the engagement signal 40 in response to the first and second hand-held game controllers 16, 18 being in an engagement state. The engagement circuitry 46 may include any combination of analog and/or digital components.

In an embodiment, the engagement signal 40 may be generated when the first and second hand-held game controllers 16, 18 are in the engaged state. This engagement signal 40 may then be transmitted to the game platform 20 for use to affect game play. The generation and transmission process may be initiated by the engagement circuitry 46 upon receipt of inputs indicative of the first and second game controllers being in an engagement state. However, it is contemplated that the game platform 20 may periodically poll the engagement circuitry 46 and in response the engagement signal 42 may be generated. The frequency in which the engagement circuitry 46 transmits the engagement signal 40 and whether such engagement signal 40 is representative of the game controllers 16, 18 being in the engaged or unengaged state may vary in accordance to those design principles of one of ordinary skill in the art.

The engagement circuitry 46 may be disposed within either or both of the first and second game controllers 16, 18. In this regard, each of the first and second game controllers 16, 18 may include electrical components capable of generating an engagement signal 40. In practice, such engagement signal 40 may be transmitted from just one of the first or second game controllers 16, 18. Alternatively, each of the game controllers 16, 18 may transmit an engagement signal 40. As one of ordinary skill in the art will appreciate, computer programming of the game platform 20 would dictate logic to determine how such incoming engagement signals 40 are used to represent whether the first and second game controllers 16, 18 are in either of the engaged or unengaged states. It is contemplated that where just two game controllers are used (such as game controllers 16, 18), generation and transmission of engagement signals 40 from both of the game controllers 16, 18 would be redundant in nature. However, where more than two game controllers are being used, each such game controller may likely include engagement circuitry capable of generating engagement signals.

While in the embodiment of FIGS. 1 and 2, the engagement signal 40 is contemplated to be wirelessly transmitted from the hand game controllers 16, 18, such engagement signal 40 may be transmitted to the game platform 20 via a wired connection.

In an embodiment, the first hand-held game controller 16 includes magnets 42a-b, and the second hand-held game controller 16 includes magnets 44. The magnets 42a-b, 44a-b are configured to magnetically interact with each other with the first and second hand-held game controllers 16, 18 being in the engaged state. The magnetic interaction may be attractive in nature to facilitate an ease of establishing the first and second hand-held game controllers 16, 18 in the engaged state. However, it is also contemplated that the magnetic interaction may be repulsive in nature so as to increase the difficulty of establishing the first and second hand-held game controllers 16, 18 in the engaged state for more advanced game play. While the first hand-held game controller 16 includes two magnets 42a-b, more or less than two magnets may be used. Similarly, while the second hand-held game controller 18 includes two magnets 44a-b, more or less than two may be used.

In addition, a respective one of the magnets 42a-b may be configured to physically contact a respective one of the magnets 44a-b with the first and second hand-held game controllers 16, 18 being in the engaged state. It is contemplated that in FIG. 2, the magnet 42a is in contact with the magnet 44b (not depicted in this view). Such physical contact may not only provide a strong magnetic engagement, such contact may facilitate electrical communication. In this regard, the magnets 44, 46 may be in electrical communication with the engagement circuitry 46. The magnets 42a-b and 44a-b may be electrically conductive and may be rare earth magnets. The contact between the magnets 42, 44 may be configured to complete an electrical path in which an electrical signal passing there through may be indicative of such contact and therefore the engaged nature of the first and second hand-held game controllers 16, 18. It is contemplated that depending upon which magnets 42a or b is in contact with magnets 44a or b, this information may be used by the game platform 20 to effect game play as may be ultimately reflected on the display device 22 (in other words, the game platform 20 may be configured to reflect through game play that the first hand-held game controller 16 is engaged to the left of the second hand-held game controller 18). Thus, not only may the game platform 20 may recognize that the first and second game controllers 16, 18 are in an engaged state, it may recognize in what manner or orientation the first and second game controllers 16, 18 are engaged. The particular material selection, magnetic strength, polarity configuration, number of magnetic components, electrical conductivity and other design characteristics of the magnets 42a-b and 44a-b may be chosen from those which are well known to one of ordinary skill in the art.

As mentioned above, the first and second game controllers 16, 18 are in fixed physical relation to each other with respect to at least one degree of freedom when in the engaged state. In the embodiment of FIGS. 1-6, the first and second game controllers 16, 18 are in fixed physical relation to each other with respect to all degrees of freedom. However, it is contemplated that other arrangements may be implemented. For example, the first and second game controllers 16, 18 may be at a fixed distance from each other by configured to rotate about one or more axis of rotation. In this regard, though not depicted, a socket and ball joint may be considered. Moreover, while the first and second game controller housings 24, 30 are in direct physical contact when the first and second game controllers 16, 18 are in the engaged state, intermediary components or couplers may be used to effect the first and second game controllers 16, 18 being in fixed physical relation to each other with respect to at least one degree of freedom when in the engaged state.

In the embodiment illustrated, the first and second game controller housings 24, 30 respectively include molded features 48a-d and 50a-d to facilitate alignment and engagement of the first and second controllers 16, 18. The molded features 48a-b are respectively sized and configured to engage with the molded features 50d-c with the first and second game controllers 16, 18 in the engaged state. Likewise, the molded features 48d-c are respectively sized and configured to engage with the molded features 50a-b with the first and second game controllers 16, 18 in the engaged state.

The particular embodiment illustrated for the first and second hand-held game controllers 16, 18 are exemplary in nature for purposes of discussing aspects of the inventions disclosed herein. It is contemplated that the first and second game controller housings 24, 30 may be formed to be of a variety of shapes and sizes that may take into design consideration the feature set of the input controls, the number and manner of engagement configurations with other controllers, ergonomics and aesthetics.

Figure 7:
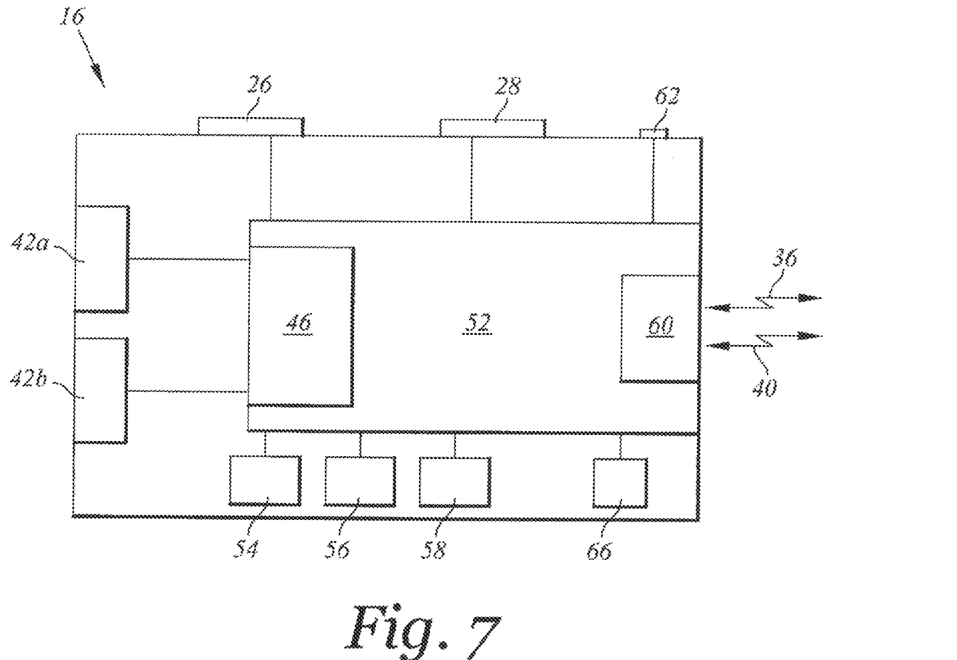
FIG. 7 is a symbolic schematic diagram of electrical components that may be disposed within the first hand-held game controller.

Referring now to FIG. 7, there is depicted a symbolic schematic diagram of electrical components that may be disposed within the first hand-held game controller 16. A similar arrangement is contemplated for the second hand-held game controller 18. Electrical circuitry 52 is provided, which may take the form of a microprocessor and/or one or more integrated circuits. It is contemplated the various electrical components and connectivity there between may be selected from those which are well known to one of ordinary skill in the art. The engagement circuitry 46 may be included in the electrical circuitry 52.

The first hand-held game controller 16 may further include a first acceleration sensor. It is contemplated that the methods and means for implementing the acceleration sensor may be chosen from those which are well known to one of ordinary skill in the art. In an embodiment, the first acceleration sensor may be configured to generate an acceleration signal in response to changes in acceleration of the first hand-held game controller 16 with respect to an axis of motion. The first acceleration sensor may take the form of the accelerometers 54, 56, 58. It is contemplated that the accelerometers 54, 56, 58 may be configured to detect changes in acceleration with respect to an axis of motion and that such axes of motion may be configured to be orthogonal to each other. In this regard, the first acceleration sensor may be used to detect changes in acceleration with regard to all axes of motion and with regard to translation and rotation. The outputs from the acceleration sensor may be used as a game input to be included in the first input control signal 36.

Movement of the first and second hand-held game controllers 16, 18 may be integral components of the user input or interactivity with the game platform 20. As such, during game play the users 10, 12 would be required to physically and cooperatively move the game controllers 16, 18 while in an engaged state. This interaction is contemplated to greatly enhance and change how game players personally interact with one another in a dimension not previously explored.

The first hand-held game controller 16 may further include a wireless transmitter 60. The wireless transmitter 60 may be integrated with the electrical circuitry 52. The wireless transmitter 60 may be configured to transmit the engagement signal 40. In addition, the wireless transmitter 60 may also be configured to transmit the first input control signal 36. In this regard the game platform 20 may be configured to wirelessly receive the first input control signal 36, the second input control signal 38, and the engagement signal 40. The transmitter 60 may be constructed from those techniques which may be chosen from those which are well known to one of ordinary skill in the art, and may include use of well established RF technology.

While the embodiment illustrated in FIGS. 1-7 contemplate a wireless transmission of the engagement signal 40 and the first and second input control signals 36, 38, it is contemplated that any of such signals 40, 36, 38 may be sent via a wired connection.

The game platform 20 is configured to interact in response to particular computer programming defining a multi-player video game. A particular game may be programmed to allow different interactivity in certain stages or time periods of game play. Visual and/or audio queues reflective of various degrees of game play options may be output from the game platform 20 to the display device 22. In addition, similar queues may be output by the first and second hand-held game controllers 16, 18. For example, the first and second hand-held game controllers 16, 18 may each be provided with a light source, such as the LED components 62, 64. The LED components 62, 64 may be configured with different colors, intensity, and be able to flash or pulsate depending upon the state of game play and particularly with regard to the engagement state of the first and second hand-held game controllers 16, 18. Similarly, the first and second hand-held game controllers 16, 18 may each be provided with a vibration motor 66 for similar purposes.

According to another embodiment there is provided a method of operating the multi-player game controller system 14. The method includes providing to the first user 10 the first hand-held game controller 16 including the first game controller housing 24 and the first input control attached to the first game controller housing 24. The first input control is configured to generate the first input control signal 36 in response to interaction with the first user 10. The method further includes providing to the second user 12 a second hand-held game controller 18. The first and second hand-held game controllers 16, 18 have engagement states of an engaged state and an unengaged state. The first and second game controllers 16, 18 are in fixed physical relation to each other with respect to at least one degree of freedom when in the engaged state. The first and second hand-held game controllers 16, 18 are independently movable in relation to each other when in the unengaged state. The second hand-held game controller 18 includes the second game controller housing 30 and the second input control attached to the second game controller housing 30, and the second input control is configured to generate a second input control signal 38 in response to interaction with the second user 12. The method further includes moving the first and second hand-held game controllers 16, 18 into the engaged state. The method further includes generating the engagement signal 40 when the first and second hand-held game controllers 16, 18 are in an engagement state.

According to various embodiments, the method may include moving the first and second hand-held game controllers 16, 18 into contact with each other. The method may include wirelessly transmitting the engagement signal 40. The method may include generating a first input control signal 36 in response to interaction with the first user 10 and the first hand-held game controller 16 with the first and second hand-held game controllers 16, 18 in the engaged state. Similarly, the method may include generating a second input control signal 38 in response to interaction with the second user 12 and the second hand-held game controller 18 with the first and second hand-held game controllers 16, 18 in the engaged state.

Figure 8:
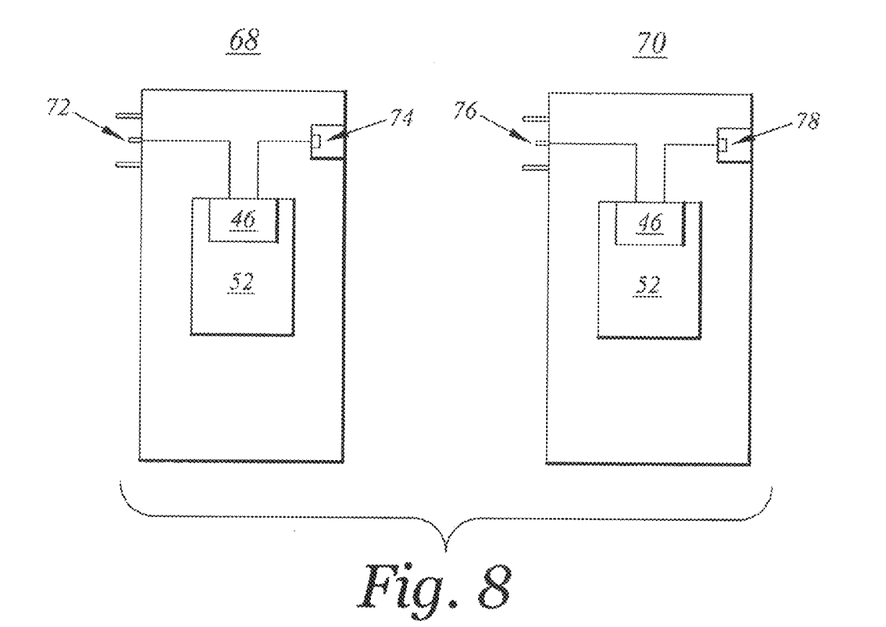
FIG. 8 is a symbolic schematic view representative of first and second hand-held game controllers each including a mechanical pin and switch for detecting an engaged state according to another embodiment.

Referring now to FIG. 8, there is depicted a symbolic schematic view representative of first and second hand-held game controllers 68, 70 according to another embodiment. The first and second hand-held game controllers 68, 70 are similar to the first and second hand-held game controllers 16, 18, however, with different elements for sensing the engagement state. Like reference numerals indicate like structures. This embodiment the first hand-held game controller 68 includes a mechanical pin 72 and a switch 74. The second hand-held game controller 70 includes a mechanical pin 76 and a switch 78. The mechanical pin 76 is cooperatively sized and configured to physically contact the switch 74 when the first and second hand-held game controllers 68, 70 are positioned adjacent each other with the mechanical pin 76 and the mechanical switch 74 facing each other. Continued physical force exerted by the mechanical pin 76 against the switch 74 is contemplated to activate the mechanical switch 76. The mechanical switch 76 may be configured to generate an electrical signal to the engagement circuitry 46 upon the switch being activated. The mechanical switch 76 may be a simple spring-loaded switch. Likewise, the mechanical pin 72 is cooperatively sized and configured to physically contact the switch 78 when the first and second hand-held game controllers 68, 70 are positioned adjacent to each other with the mechanical pin 72 and the switch 78 facing each other. The mechanical pins 72, 76 and the switch 74, 78 may be constructed from those techniques which may be chosen from those which are well known to one of ordinary skill in the art.

Figure 9:
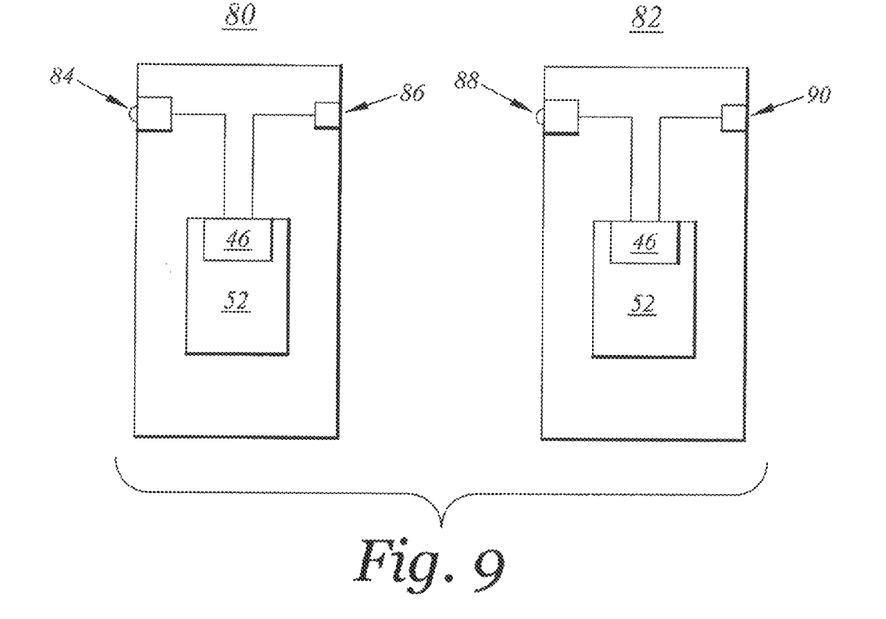
FIG. 9 is a symbolic schematic view representative of first and second hand-held game controllers each including light source and a light detector for detecting an engaged state according to another embodiment.

Referring now to FIG. 9, there is depicted a symbolic schematic view representative of first and second hand-held game controllers 80, 82 according to another embodiment. The first and second hand-held game controllers 80, 82 are similar to the first and second hand-held game controllers 16, 18, however, with different elements for sensing the engagement state. Like reference numerals indicate like structures. This embodiment the first hand-held game controller 80 includes a light source 84 and a light detector 86. The second hand-held game controller 82 includes a light source 88 and a light detector 90. The light sources 84, 88, may be infrared light sources, such as LED lights. The light detectors 86, 90 may be photodiodes. The light detector 86 is cooperatively sized and configured to detect light from the light source 88 upon the first and second hand-held game controllers 80, 82 being positioned adjacent each other with light detector 86 is and the light source 88 facing each other. The light source 88 and the light detector 86 may be cooperatively sized, configured and calibrated to trigger a signal representative of the light source 88 and the light detector 86 being a predetermined distanced from each other. Such pre-determined distance may be established such that the first and second hand-held game controllers 80, 82 are in physical contact with each other. Upon such signal being sent to the engagement circuitry 46, the engagement circuitry 46 may generate the engagement signal 40. Upon such physical contact being established, it is contemplated that the first and second game controllers 80, 82 are in fixed physical relation to each other with respect to at least one degree of freedom when in the engaged state. Likewise, the light detector 90 is cooperatively sized and configured to detect light from the light source 84 upon the first and second hand-held game controllers 80, 82 being positioned adjacent each other with light detector 90 is and the light source 84 facing each other. The light detectors 86, 90 and the light sources 84, 88 may be constructed from those techniques which may be chosen from those which are well known to one of ordinary skill in the art.

As mentioned above, the light source 88 and the light detector 86 may be cooperatively sized, configured and calibrated to trigger a signal representative of the light source 88 and the light detector 86 being a predetermined distanced from each other. Such pre-determined distance may be established such that the first and second hand-held game controllers 80, 82 are not in physical contact with each other. Upon such signal being sent to the engagement circuitry 46, the engagement circuitry 46 may generate the engagement signal 40. In this regard the first and second game controllers 80, 82 are contemplated to be in close physical proximity to each other when in the engaged state. As used herein being in close physical proximity refers to the multi-player game controller system having the capability to detect or sense the relative distance or positioning of the first and second game controllers 80, 82 with respect to each other.

Moreover, the intensity of the detected light may be translated to an electrical signal as well. This electrical information may be processed by the engagement circuitry 46 and included in the engagement signal 40. In this regard, the game platform 20 may be configured to use such signal as representative of a distance between the first and second game controller 80, 82 to impact game play. For example, the smaller the distance between the first and second game controller 80, 82 during an engaged state may result in enhanced features set values in the particular game being played.

While the embodiments depicted above contemplated a side-by-side hand-held game controller engagement, other orientations or options for other orientation may be contemplated. For example one controller may be upside down relative to another hand-held game controller while in the engaged state. The method and means of detecting whether the hand-held game controllers are in a specific orientation relative to each other may be accomplished via any of those methods which are well known to one of ordinary skill in the art. For example where conductive magnets are utilized to detect an engaged state, more than on pairing of magnets may be used with each side of a given hand-held game controller having at least two magnets that magnetically and electrically interact with corresponding magnets of the other engaging hand-held game controller. The engagement circuitry may be configured to recognize or at least include information unique to each engagement configuration so as facilitate the game platform to use such information so as to impact game play. Thus users may be "rewarded" with enhanced gaming features during game play to being in an engaged state which is perceived as being more difficult to operate the hand-held game controllers.

It is contemplated that the hand-held game controllers may take the form of a mobile communications device, such as a mobile phone, smart phone or PDA. Engagement circuitry could be integrated with on-board communications circuitry. It is contemplated that such devices would need to be modified to facilitate a means for detecting engagement with one another. For example an add-on aftermarket component may be added to facilitate such functionality. Moreover, it is contemplated that such devices may include output display screens which may be used by the users for game play. The game platform may be located locally and interacted with wirelessly, such a via an RF connection, or via a wired connection. In addition, the game platform may be remote and access wirelessly such as via a WiFi connection to the Internet.

Figure 10:
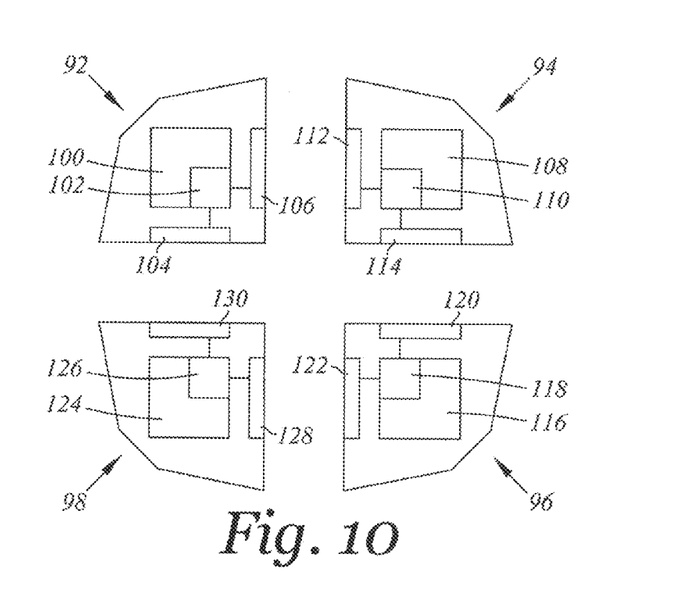
FIG. 10 is a symbolic schematic view representative of first, second, third and forth hand-held game controllers according to another embodiment.

Referring now to FIG. 10, there is depicted a symbolic schematic view representative of first, second, third and forth hand-held game controllers 92, 94, 96, 98 according to another embodiment. The first, second, third and forth hand-held game controllers 92, 94, 96, 98 are similar to the first hand-held game controller 16 as discussed above, however, with the differences noted. The first hand-held game controller 92 includes electrical circuitry 100 that includes engagement circuitry 102. The first hand-held game controller 92 further includes magnets 104, 106 that are each respectively in electrical communication with the engagement circuitry 102. The electrical circuitry 100, the engagement circuitry 102, and the magnets 104, 106 are similar in respect to electrical circuitry 52, the engagement circuitry 46, and the magnets 42a-b. Likewise, the second hand-held game controller 94 includes electrical circuitry 108, engagement circuitry 110, and magnets 112, 114, the third hand-held game controller 96 includes electrical circuitry 116, engagement circuitry 118, and magnets 120, 122, and the forth hand-held game controller 98 includes electrical circuitry 124, engagement circuitry 126, and magnets 128, 130.

In this embodiment, it is contemplated that each of the first, second, third and forth hand-held game controllers 92, 94, 96, 98 may be in an engaged state with one or two of the other first, second, third and/or forth hand-held game controllers 92, 94, 96, 98. As such, each engagement circuitry 102, 110, 118, 126 is configured to respectively receive electrical signals from the magnets 104, 106, 112, 114, 120, 122, 128, 130 which are correlated to electrical paths being established between and/or among the first, second, third and forth hand-held game controllers 92, 94, 96, 98. Such electrical signals representing the establishment of the engaged states being established between and/or among the first, second, third and forth hand-held game controllers 92, 94, 96, 98. It is contemplated that the engagement circuitry 102 is programmed to identify which specific one or ones of the second, third and/or forth hand-held game controllers 94, 96, 98 is engaged with the first hand-held game controller 92. Each of the engagement circuitry 110, 118, 126 is likewise so programmed. Such information is contemplated to be included in the transmitted engagement signals.

In this regard, this embodiment is exemplary of more than two hand-held game controllers being implemented in a multi-player game controller system. This embodiment contemplates four such hand-held game controllers being implemented, more than four are contemplated. In addition, this embodiment is exemplary of a given hand-held game controller being capable to be simultaneously engaged the more that one hand-held game controller. This embodiment contemplates that each hand-held game controller may be simultaneously engaged with two other hand-held game controllers. It is contemplated that more than two hand-held game controllers may be simultaneously engaged. It is further contemplated that each of the hand-held game controllers need not have the same input controls. Thus, various combinations of hand-held game controllers may result in different functionality being programmed to the particular game.

Figure 11:
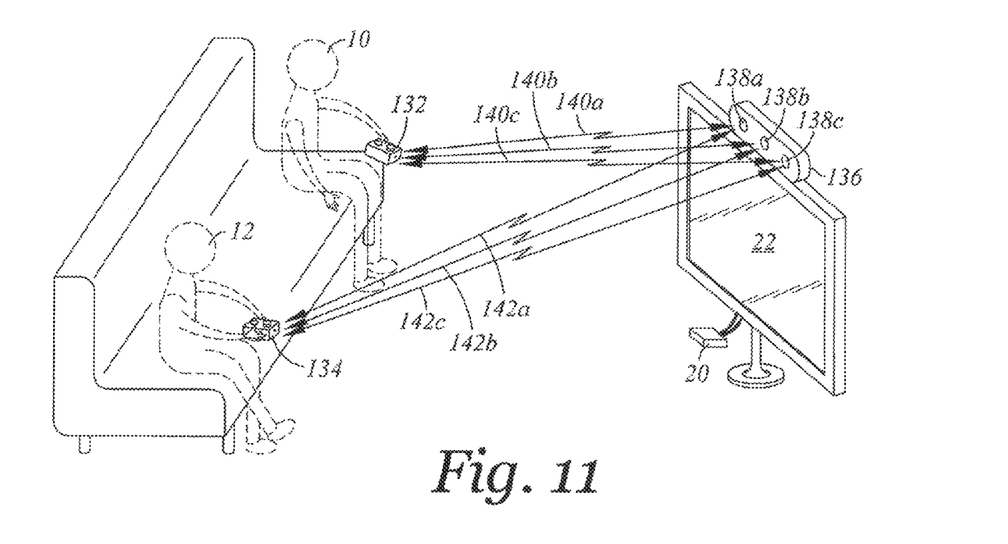
FIG. 11 is a symbolic exemplary environment including users as interacting with a multi-player game controller system with first and second hand-held game controllers in an unengaged state.

Referring now to FIG. 11, there is depicted a symbolic exemplary environment including users as interacting with a multi-player game controller system with first and second hand-held game controllers 132, 134 in an unengaged state. The first and second hand-held game controllers 132, 134 are similar to the first and second hand-held game controllers 16, 18, however, with different elements for sensing the engagement state. Like reference numerals indicate like structures. This embodiment the multi-player game controller system includes a sensor device 136. The sensor device 136 is contemplated to be electrically connected to the game platform 20. This may be a wired or wireless connection. The sensor device 136 may include sensor components 138*a-c*. The sensor components 138*a-c* may be RF based elements configured to generate RF signals. In this regards, the sensor components 138*a-c* may be configured to generate sensing signals 140*a-c* and 142*a-c* to respectively detect the angular position and distance of the first and second game controllers 132, 134. Using such sensing signals 140*a-c* and 142*a-c* as inputs a microprocessor may be configured to determine a relative location of each of the first and second hand-held game controllers 132, 134, such as by using triangulation techniques. The sensor device 136 may be constructed from those techniques which may be chosen from those which are well known to one of ordinary skill in the art, which may additionally require components included within the first and second hand-held game controllers 132, 134. Like the embodiment of FIG. 9 discussed above, the engagement circuitry may be configured to generate engagement signals based upon the first and second hand-held game controllers 132, 134 being in physical contact with each other or based upon some predetermined distance or distances (for varying degrees of game responsiveness). In this regard the first and second hand-held game controllers 132, 134 may be close proximity to each other when in the engaged state. Such close proximity may be calibrated to be some pre-determined distance or actual contact.

In this embodiment the engagement circuitry is not located on-board either of the controllers 132, 134. Rather, the engagement circuitry may be disposed within sensor device 136. Alternatively, the engagement circuitry may be disposed within the game platform 20. In addition, while the sensor device 136 is depicted as a separate unit from the game platform 20, the sensor device 136 may be integrated in a single device housing with the game platform 20.

It is contemplated that any number of arrangements may be implemented to facilitate detecting or sensing of the hand-held game controllers being in an engaged state. As discussed above, such engaged state may or may not include being in physical contact. Further, the methods and apparatus for sensing of the engaged state may be chosen from those which are well known to one of ordinary skill in the art and may included use of electrical contacts, electro-mechanical switches and contacts, mechanical switches, magnetic switches, cameras coupled with image recognition software, radio waves and other forms of electromagnetic waves, flex or pressure switches, and even gps technology.

According to an embodiment, the underlying software programming for use with the multi-player game controller system 14 may include the following modules or sections: 1) controller specific logic, 2) aggregator of all the various controller engagement states, 3) generic mapping class that allows loose coupling of the software to the hardware, and 4) custom event that developers may use to determine controller status. The controller specific logic is software programming that communicates with the hardware. The controller specific logic maps all of the input and output signals of each of the hand-held game controllers the software programming. This software programming may be specific to the electrical hardware components. The aggregator of all the various hand-held game controller states is configured to store the various combined engagement states of all the hand-held game controllers. The generic mapping class is configured to allow a loose coupling of software to the hardware. The generic mapping class takes all input events and maps them to a custom event. Input events are user inputs such as keyboard, mouse, and hand-held game controllers. These input events are all mapped to one type of custom output event. Thus, a developer's code does not need to change if the underlying software programming of the controller specific logic and the controller aggregator is changed. The custom event that developers may use to determine controller status has many generic variables with values such as up/down/left/right, in addition to custom values such as an indication of the engagement states. These values give the events flexibility and structure, so software developers may embed logic and needs of the particular game into the event as well as use the existing values.

The particulars shown herein are by way of example only for purposes of illustrative discussion, and are presented in the cause of providing what is believed to be the most useful and readily understood description of the principles and conceptual aspects of the various embodiments set forth in the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A multi-player game controller system comprising:
a first hand-held game controller including;
a first game controller housing; and
a first input control attached to the first game controller housing, the first input control being configured to generate a first input control signal in response to, interaction with a first user;
a second hand-held game controller, the first and second hand-held game controllers having engagement states of an engaged state and an unengaged state, the first and second hand-held game controllers being in fixed physical relation to each other with respect to at least one degree of freedom when in the engaged state, the first and second hand-held game controllers being independently movable in relation to each other when in the unengaged state, the second hand-held game controller including;
    a second game controller housing; and
    a second input control attached to the second game controller housing, the second input control being configured to generate a second input control signal in response to interaction with a second user;
a third hand-held game controller, the second and third hand-held game controllers having engagement states of an engaged state and an unengaged state, the second and third hand-held game controllers being in fixed physical relation to each other with respect to at least one degree of freedom when in the engaged state, the second and third hand-held game controllers being independently movable in relation to each other when in the unengaged state, the third hand-held game controller including:
    a third game controller housing; and
    a third input control attached to the third controller housing, the third input control being configured to generate a third input control signal in response to interaction with a third user; and
engagement circuitry configured to generate an engagement signal in response to the first and second hand-held game controllers being in an engagement state, and configured to generate an engagement signal in response to the second and third hand-held game controllers are in an engagement state.

2. The game controller system of claim 1 wherein the first hand-field game controller further includes a first magnet, the second hand-held game controller further includes a second magnet, the first and second magnets are configured to magnetically interact with each other with the first and second hand-held game controllers being in the engaged state.

3. The game controller system of claim 2 wherein the first and second magnets are configured to physically contact each other with the first and second hand-held game controllers being in the engaged state.

4. The game controller system of claim 2 wherein the first and second magnets are in electrical communication with the engagement circuitry.

5. The game controller system of claim 1 wherein the first hand-held game controller further includes an infrared light source, the second hand-held game controller further includes an infrared light detector sized and, configured to detect infrared light from the infrared light source with the first and second hand-held game controllers being in the engaged state.

6. The controller system of claim 1 wherein the first and second hand-held game controllers are in physical contact with each other when in the engaged state.

7. The game controller system of claim 1 wherein the first hand-held game controller includes a first acceleration sensor, the first acceleration sensor is configured to generate an acceleration signal in response to changes in acceleration of the first hand-held game controller with respect to an axis of motion.

8. The game controller system of claim 7 wherein the first acceleration sensor is an accelerometer.

9. The game controller system of claim 7 wherein the first acceleration sensor is configured to generate the acceleration signal in response to changes in acceleration of the first hand-held game controller with respect to an axis of motion.

10. The game controller system of claim 7 wherein the first acceleration sensor is configured to generate the acceleration signal in response to changes in rotational acceleration of the first hand-held game controller with respect to an axis of motion.

11. The game controller system of claim 1 wherein the first hand-held game controller further includes a wireless transmitter configured to transmit the engagement signal.

12. The game controller system of claim 1 wherein the first hand-held game controller further includes a first magnet, the second hand-held game controller further includes a second magnet, the first and second magnets are configured to magnetically interact with each other with the first and second hand-held game controllers being in the engaged state, the second hand-held game controller further includes a third magnet, the third hand-held game controller includes a fourth magnet, the third and fourth magnets are configured to magnetically interact with each other with the second and third hand-held controllers being in the engaged state.

13. The game controller system of claim 1 further includes a game platform, the game platform is configured to receive the first input control signal, the second input control signal, and the engagement signal.

14. The game controller system of claim 13 wherein the game platform configured to wirelessly receive the first input control signal, the second input control signal, and the engagement signal.

15. The game controller system of claim 1 wherein the first and second hand-held game controllers are in fixed physical relation to each other with respect to all of degrees of freedom when in the engaged state.

16. A multi-player game controller system comprising:
    a first hand-held game controller including;
        a first game controller housing;
        a first input control attached to the first game controller housing, the first input control being configured to generate and wirelessly transmit a first input control signal in response to interaction with a first user; and
        an infrared light source;
    a second hand-held game controller, the first and second hand-held game controllers having engagement states of an engaged state and an unengaged state, the first and second hand-held game controllers being in close physical proximity to each other when in the engaged state, the first and second hand-held game controllers being independently movable in relation to each other when in the unengaged state, the second hand-held game controller including;
        a second game controller housing; and
        a second input control attached to the second game controller housing, the second input control being configured to generate a second input control signal in response to interaction with a second user; and
        an infrared light detector sized and configured to detect infrared light from the infrared light source with the first and second hand-held game controllers being in the engaged state;
    a transmitter in electrical communication with the infrared light detector and
    engagement circuitry configured to generate an engagement signal when the first and second hand-held game controllers are in an engagement state, the engagement circuitry including the transmitter, the transmitter being configured to wirelessly transmit the engagement signal upon detection of infrared light from the infrared light source by the infrared light detector.

17. The game controller system of claim 16 further includes an infrared light source and an infrared light detector cooperative configured to determine a distance between the first and second hand-held game controllers.

18. The game controller system of claim 16 wherein the engagement circuitry is configured to generate an engagement signal when the first and second hand-held game controllers are within a pre-determined distance of each other.

19. A method of operating a multi-player game controller system, the method comprising:
   a) providing to a first user a first hand-held game controller including a first game controller housing and a first input control attached to the first game controller housing, the first input control being, configured to generate a first input control signal in response to interaction with the first user;
   b) providing to a second user a second hand-held game controller, the first and secondhand-held game controllers having engagement states of an engaged state and an unengaged state, the first and second game controllers being in fixed physical relation to each other with respect to at least one degree of freedom when in the engaged state, the first and second hand-held game controllers being independently movable in relation to each other when in the unengaged state, the second hand-held game controller including a second game controller housing and a second input control attached to the second game controller housing, the second input control being configured to generate a second input control signal in response to interaction with the second user; and
   c) moving the first and second hand-held game controllers into the engaged state;
   d) generating an engagement signal when the first and second hand-held game controllers are in an engagement state; and
   f) generating a first input control signal in response to interaction with the first user and the first hand-held game controller with the first and second hand-held game controllers in the engaged state and generating a second input control signal in response to interaction with the second user and the second hand-held game controller with the first and second hand-held game controllers in the engaged state while the first user physically interacts with the first hand-held game controller and the second user physically interacts with the second hand-held game controller.

20. The method of claim 19 wherein c) includes moving the first and second hand-held game controllers into contact with each other.

21. The method of claim 19 further includes:
   e) wirelessly transmitting the engagement signal.

22. A method of operating a multi-player game controller system, the method comprising:
   a) providing to a first user a first hand-held game controller including a first game controller housing and a first input control attached to the first game controller housing, the first input control being configured to generate a first input control signal in response to interaction with the first user;
   b) providing to a second user a second hand-held game controller, the first and second hand-held game controllers having engagement states of an engaged state and an unengaged state, the first and second hand-held game controllers being in close proximity to each other when in the engaged state, the first and second hand-held game controllers being independently movable in relation to each other when in the unengaged state, the second hand-held game controller including a second game controller housing and a second input control attached to the second game controller housing, the second input control being configured to generate a second input control signal in response to interaction with the second user; and
   c) moving the first and second hand-held game controllers into the engaged state;
   d) generating an engagement signal when the first and second hand-held game controllers are in an engagement state; and
   f) generating a first input control signal in response to interaction with the first user and the first hand-held game controller with the first and second hand-held game controllers in the engaged state and generating a second input control signal in response to interaction with the second user and the second hand-held game controller with the first and second hand-held game controllers in the engaged state while the first user physically interacts with the first hand-held game controller and the second user physically interacts with the second hand-held game controller.

23. The method of claim 22 further includes:
   e) wirelessly transmitting the engagement signal.

24. A multi-player game controller system comprising:
   a first hand-held game controller including;
      a first game controller housing;
      a first input control attached to the first game controller housing, the first input control being configured to generate a first input control signal in response to interaction with a first user; and
      a first magnet;
   a second hand-held game controller, the first and second hand-held game controllers having engagement states of an engaged state and an unengaged state, the first and second hand-held game controllers being in fixed physical relation to each other with respect to at least one degree of freedom when in the engaged state, the first and second hand-held game controllers being independently movable in relation to each other when in the unengaged state, the second hand-held game controller including;
      a second game controller housing;
      a second input control attached to the second game controller housing, the second input control being configured to generate a second input control signal in response to interaction with a second user; and
      a second magnet the first and second magnets are configured to magnetically repulse each other with the first and second hand-held game controllers being in the engaged state; and
   engagement circuitry configured to generate an engagement signal in response to the first and second hand-held game controllers being in an engagement state.

* * * * *